（12) United States Patent
Fuchs et al.

(10) Patent No.: US 9,598,298 B2
(45) Date of Patent: Mar. 21, 2017

(54) METHOD AND FACILITY FOR TREATING WASTEWATER CONTAINING HYDROCARBONS, IN PARTICULAR AROMATIC COMPOUNDS

(75) Inventors: Cathy Fuchs, Suresnes (FR); Craig Wallis, Paris (FR); Benoit Tommy-Martin, Paris (FR)

(73) Assignee: ONDEO INDUSTRIAL SOLUTIONS (FR)

( * ) Notice: Subject to any disclaimer, the term of this patent is extended or adjusted under 35 U.S.C. 154(b) by 405 days.

(21) Appl. No.: 14/342,163

(22) PCT Filed: Aug. 27, 2012

(86) PCT No.: PCT/IB2012/054386
§ 371 (c)(1),
(2), (4) Date: Mar. 21, 2014

(87) PCT Pub. No.: WO2013/030751
PCT Pub. Date: Mar. 7, 2013

(65) Prior Publication Data
US 2014/0231345 A1 Aug. 21, 2014

(30) Foreign Application Priority Data

Aug. 30, 2011 (FR) ...................... 11 57626

(51) Int. Cl.
*C02F 3/00* (2006.01)
*C02F 9/00* (2006.01)
(Continued)

(52) U.S. Cl.
CPC .................. *C02F 9/00* (2013.01); *C02F 1/20* (2013.01); *C02F 3/00* (2013.01); *C02F 1/24* (2013.01);
(Continued)

(58) Field of Classification Search
CPC ....... C02F 2101/322; C02F 1/20; B01D 53/84
(Continued)

(56) References Cited

U.S. PATENT DOCUMENTS

| 2,927,075 A * | 3/1960 | Brown ...................... C02F 1/26 |
| | | 208/208 R |
| 4,857,198 A | 8/1989 | Meidl |

(Continued)

OTHER PUBLICATIONS

Phillips J B: "Removal of benzene from industrial wastewater by vapor stripping", Journal of Environmental Science and Health Part A. Toxic: Hazardous substances & Environmental engineering, New York : Dekker, vol. 30, No. 5, dated Jun. 1, 1995, pp. 1075-1090.
(Continued)

*Primary Examiner* — Nam Nguyen
*Assistant Examiner* — Claire Norris
(74) *Attorney, Agent, or Firm* — The Belles Group, P.C.

(57) ABSTRACT

The invention relates to a method for treating wastewater containing hydrocarbons, in particular hydrocarbons from the group of compounds referred to as BTEX, comprising benzene, toluene, ethylbenzene and xylene aromatic compounds, said wastewater being in particular from the production or conditioning of natural gas, wherein, according to the method, the wastewater is subjected to stripping by the natural gas such that the hydrocarbon pollution is not only removed from the water by means of being transferred to the gas, but also eliminated during the subsequent combustion of the gas. The wastewater to be treated has a soluble BTEX content that is no higher than 1,200 ppm, preferably no higher than 900 ppm, and the weight ratio of the stripping gas to the treated water is less than 10%, the water being discharged from the stripper having a soluble BTEX content that is no higher than 30 ppm.

14 Claims, 1 Drawing Sheet

(51) Int. Cl.
  *C02F 1/20*   (2006.01)
  *C02F 1/24*   (2006.01)
  *C02F 1/00*   (2006.01)
  *C02F 3/06*   (2006.01)
  *C02F 101/32* (2006.01)

(52) U.S. Cl.
  CPC .......... *C02F 3/06* (2013.01); *C02F 2001/007* (2013.01); *C02F 2101/322* (2013.01); *Y02W 10/15* (2015.05)

(58) Field of Classification Search
  USPC ............................................ 210/609; 95/263
  See application file for complete search history.

(56) References Cited

U.S. PATENT DOCUMENTS

2009/0101572 A1* 4/2009 Sullivan .................... C02F 9/00
                                                       210/601
2011/0186510 A1* 8/2011 Whiteman ................ C02F 3/00
                                                       210/630

OTHER PUBLICATIONS

Waldie, et al: "Removal of dissolved Aromatics from Water" Chemical Engineering Research and Design, Part A, Institution of Chemical Engineers, XX, vol. 76, No. 5, dated Jul. 1, 1998, pp. 562-570.
Corresponding International Search Report dated Nov. 29, 2012.

* cited by examiner

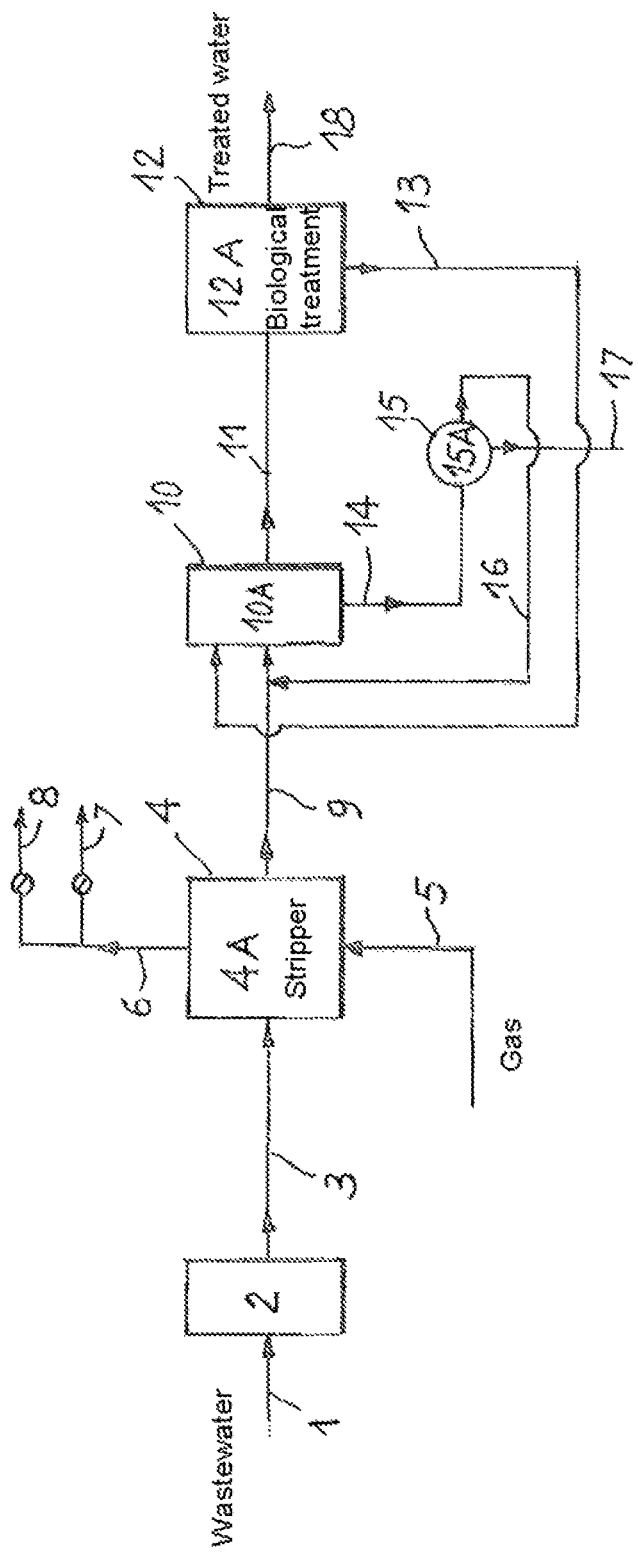

METHOD AND FACILITY FOR TREATING WASTEWATER CONTAINING HYDROCARBONS, IN PARTICULAR AROMATIC COMPOUNDS

PRIORITY

Priority is claimed as a national stage application, wider 35 U.S.C. §371, to international application No. PCT/IB2012/054386, filed Aug. 27, 2012, which claims priority to French application FR1157626, flied Aug. 20, 2011. The disclosures of the aforementioned priority applications are incorporated herein by reference in their entirety.

The invention relates to a process for treating wastewater containing hydrocarbons, in particular hydrocarbons from the group of compounds referred to as BTEX containing aromatic compounds: benzene, toluene, ethylbenzene and xylenes (ortho, meta and para).

The invention relates more particularly, but nonexclusively, to wastewater originating from the production or conditioning of natural gas. Water of this type contains compounds which are not compatible with direct discharge into the natural environment (river, lake or sea). The compounds from the BTEX group are often present in high concentration, up to a few grams per liter, in the water accompanying the production or conditioning of natural gas, and which, in the interests of simplification, is referred to as "produced water". Since these compounds are volatile, it is also advisable to avoid discharging them into the atmosphere.

The removal of BTEXs present in produced water, originating from the production or conditioning of natural gas, is often based on a process using adsorption or absorption on a granular medium such as clays, modified zeolites, active carbon or organic matter. This type of process requires regeneration or periodic replacement of the adsorption materials owing to the saturation thereof with the hydrocarbons removed from the water.

A technology that is also currently used consists of a process known under the name MPPE (macro porous polymer extraction). The process uses two or more columns containing beds of granular polymer. The polymer acts as a support for an extraction medium specially selected for its capacity to foe to absorb aqueous-phase hydrocarbons. The water to foe treated is introduced into the columns and the hydrocarbons present in the water stream are removed by this absorption process. The group of BTEX compounds is included in the compounds removed by this process. When a column is saturated with hydrocarbons, a regeneration of its material should be carried out. The regeneration is obtained by injecting vapor into the column: the hydrocarbons are stripped from the granules of support material by the vapor. This vapor, which leaves contaminated with the hydrocarbons, is then condensed. The hydrocarbons present in the condensate are physically separated by gravity and the resulting concentrate is removed as waste, or is recycled. Because of this need for regeneration, at least two columns are required: one for treating the water, and one undergoing regeneration. Generally, a column remains in the treatment phase for approximately one hour and is then regenerated for one hour.

The regeneration phases complicate the treatment operations. In addition, the pollution in the water is shifted from the aqueous phase to another phase, but the question of its elimination remains.

According to the article by J B Phillips: "Removal of benzene from industrial wastewater by vapor stripping" JOURNAL OF ENVIRONMENTAL SCIENCE AND HEALTH, PART A. TOXIC: HAZARDOUS SUBSTANCES & ENVIRONMENTAL ENGINEERING, NEW YORK: DEKKER, vol. 30, No. 5, Jun. 1, 1995 (1995 Jun. 1, pages 1075-1090, a process for treating wastewater containing benzene at 1700 ppm (saturation limit) is known, according to which process the wastewater is subjected to stripping by natural gas. The pollution is removed from the water by transfer into the gas, and is then eliminated during the subsequent combustion of the gas. The weight ratio of the stripping gas to the water treated is high, greater than 50%, which requires a high energy expenditure, not very compatible with industrial treatments relating to substantial flow rates of polluted water.

The objective of the invention is, especially, to provide a process for removing the BTEX compounds and more generally the hydrocarbons present in wastewater intended to be discharged into the natural environment, which snakes it possible, at a lower energy cost, to obtain a lowering of BTEXs sufficient for it to be possible for the stripped water to be allowed to pass onto a biological treatment for refining it necessary.

The treated water can be discharged without polluting the aqueous phase, nor the terrestrial gas phase.

According to the invention, the process tor treating wastewater containing hydrocarbons, in particular hydrocarbons from the group of compounds referred to as BTEX, comprising benzene, toluene, ethylbenzene and xylene aromatic compounds, this wastewater originating in particular from the production or conditioning of natural gas, according to which process the wastewater is subjected to stripping by natural gas such that the hydrocarbon pollution not only is removed from the water by transfer into the gas, but also is eliminated during the subsequent combust ion of the gas, is characterized in that:

the wastewater which enters the stripping has a soluble BTEX content of less than or equal to 1200 ppm, preferably less than or equal to 900 ppm, and the weight ratio of the stripping gas to the treated water is less than 10%, the water which leaves the stripping having a soluble BTEX content of less than or equal to 30 ppm.

Preferably, the weight ratio of the stripping gas to the treated water is less than 3%, preferably less than 2%.

The stripping natural gas can be loaded with aromatic compounds, and can have a BTEX content of between 1000 ppm (by weight) and 15 000 ppm (by weight).

In general, the contents expressed in the description and the claims are contents by weight.

According to the invention, with a relatively low stripping gas/polluted water ratio, less than 10%, a sufficient lowering of BTEX (less than 30 ppm in the stripped water) is obtained such that the stripped water can be allowed to pass onto a biological treatment for refining if necessary.

The treatment process of the invention starts from polluted water containing at most 1200 ppm of soluble BTEX, and implements stripping with gas with a weight ratio of less than 10%, preferably less than 3%. In this way, after stripping carried out even with a gas considered to be "dirty", which has a BTEX content of between 1000 ppm (by weight) and 15 000 ppm (by weight), the water contains less than 30 ppm of soluble BTEX and can thus be treated biologically, if a higher quality of treated water, in particular containing less than 8 ppm of benzene, is needed.

The combustible stripping gas can also consist of "clean" natural gas, i.e. gas which has a BTEX content of less than 1000 ppm.

The stripping natural gas can foe the gas from the production or conditioning of natural gas from which the wastewater to foe treated originates.

The water, after stripping, can foe subjected to a biological treatment. The biological treatment can be carried out in fixed cultures, or in mixed cultures, or in free cultures.

A step for removing suspended matter and residual insoluble hydrocarbons is provided for between the stripping and the biological treatment. This removal of suspended matter and residual insoluble hydrocarbons can be carried out by flotation, especially in a flotation tank, in particular air flotation.

The sludge from the biological treatment can be recycled to the entry of the step for removing suspended matter provided for between the stripping and the biological treatment.

The sludge from the step for removing suspended matter can be subjected to dehydration and the liquid produced is recycled to the entry of the step for removing suspended matter, while the dehydration sludge is expelled to the discharge.

The gas which was used for the stripping of the water can be recompressed and sent back to the distribution circuit with a view to exploiting the calorific value of the BTEXs extracted from the water.

The invention also relates to a facility for treating wastewater containing hydrocarbons, in particular hydrocarbons from the group of compounds referred to as BTEX, this wastewater originating in particular from the production or conditioning of natural gas, comprising a combustible-gas stripper, in particular a natural-gas stripper, in which the wastewater is subjected to stripping, such that the hydrocarbon pollution is not only removed from the water by transfer into the gas, but is also eliminated during the subsequent combustion of the gas, characterized in that it comprises a biological filter downstream of the stripper for biological treatment of the water leaving the stripper.

In the facility, the gas that was used for the stripping of the water can be recompressed and sent back to the distribution circuit with a view to exploiting the calorific value of the BTEXs extracted from the water.

The invention consists, apart from the arrangements set out above, of a certain number of other arrangements which will be more explicitly referred to hereinafter with respect to an example of implementation described with reference to the appended drawing, which is in no way limiting. On this drawing:

The single FIGURE is a diagram of a facility implementing the process of the invention.

Referring to the FIGURE of the drawing, a facility for treating polluted wastewater arriving via a pipe 1, originating from the production of natural gas, can be seen, represented schematically.

This water, which may be present in gas extracted by underground or underwater drilling, is called "produced water" to simplify the terminology. The water may also originate from the conditioning of natural gas, in particular during compression thereof or storage thereof. This water is loaded with polluting hydrocarbons, in particular with hydrocarbons from the group of compounds known as BTEX containing aromatic compounds: benzene, toluene, ethylbenzene and xylenes (ortho, meta and para). These compounds are often present in high concentration, unacceptable for direct discharge into the environment.

By way of nonlimiting example, for discharge of water into the sea, the water mast not contain more than 8 ppm (8 parts per million) of benzene. However, the wastewater admitted via the pipe 1 may contain up to 660 ppm of benzene and up to 900 ppm of BTEX (benzene ≤660 ppm; BTEX ≤900 ppm), this example not being limiting.

The flow rate of water to be treated may be about 30 $m^3/h$.

A first optional step of the treatment is provided by a gravitational, separator 2 of insoluble hydrocarbons. The separator may be of the API (American Petroleum Institute) or CPI (corrugated plate interceptor) or PPI (parallel plate interceptor) type.

The water which leaves the separator 2 via a pipe 3 has substantially the same content of soluble BTEX pollutants as when it entered.

According to the invention, the water to be treated is then introduced into a stripper 4A, where it undergoes a stripping treatment 4 by a combustible gas, in particular natural gas, introduced via a pipe 5. The "stripping", or desorption, consists in extracting the gases dissolved in the water so as to make them pass into the gas phase. The gases extracted from the liquid phase are entrained by a strong countercurrent of combustible gas. The stripper is the apparatus which makes it possible to perform this operation.

The stripper 4A is of the plate column or packed column type (Pall ring or similar). The choice of the type of column is based on the content of pollutants in the crude water: for example, the presence of a large amount of suspended matter favors the choice of a plate column.

The combustible gas is introduced, under pressure, into the bottom part of the stripper 4A via a pipe 5 and is distributed over the entire cross section so as to cause bubbling in the water to be treated which fills the stripper 4A.

The gas babbles, while rising in the water, become loaded with BTEX compounds and other pollutants of the water. The gas contaminated with the BTEX compounds, transferred from the treated water, leaves the stripper 4A via a pipe 6.

The pressure of the gas injected via the pipe 5 may be about 5 to 6 bar, in particular 5.5 bar. The contaminated gas leaving via the pipe 6 is at a reduced relative pressure, in particular less than 0.5 bar, about 0.4 bar.

Surprisingly, efficient stripping is obtained with "dirty" natural gas, i.e. gas loaded with aromatic compounds, which has a BTEX content of between 1000 ppm and 15 000 ppm.

Of course, the combustible gas injected via the pipe 5 may be "clean" natural gas, i.e. a gas of which the BTEX content is less than 1000 ppm.

Advantageously, the stripping natural gas is the gas from the production or conditioning of natural gas from which the wastewater to be treated originates.

The weight ratio of the stripping gas to the water to be treated is generally less than 3%, preferably less than 2%. Thus, to treat a water flow rate of 28 $m^3/h$, the gas flow rate by weight may be 350 kg/h, i.e. approximately 1.25%.

The contaminated gas leaving via the pipe 6 can have a weight content of BTEX of greater than 60 000 ppm (sixty thousand ppm).

The contaminated gas can be directed, via a pipe 7 controlled by a valve, to recycling, after compression, in the gas production facility, or via a pipe 8, also controlled by a valve, to a flare.

Thus, according to the invention, the stripping of the polluted water, in the stripper 4, by combustible gas makes it possible not only to strip the water in particular of its BTEX compounds, but also to eliminate these BTEX compounds during the subsequent combustion of the gas either in a flare, or during the use of the gas.

The water which leaves the stripper 4 in a pipe 9 has a soluble BTEX content of less than or equal to 30 ppm, preferably less than or equal to 20 ppm, while its benzene content is less than or equal to 15 ppm, preferably less than or equal to 12 ppm, when the gas used is dirty. With a clean gas, the water which leaves the stripper 4 has a soluble BTEX content of less than 10 ppm.

In the first stages of the treatment, the water is kept away from air so as to avoid the BTEXs escaping into the external atmosphere.

The water leaving via the pipe 9 is advantageously subjected to an additional treatment step 10 aimed at further reducing the suspended matter and/or the residual insoluble hydrocarbons. This additional step 10 may foe of the following type:
  decanting,
  flotation,
  filtration,
  further stripping, in particular with nitrogen.

Advantageously, step 10 is carried out in a flotation tank 10A.

This additional step 10 is optional and depends on the quality of the water leaving the stripper 4, on the quality of the gas injected via the pipe 5 and on the acceptable standards for discharge into the environment.

The water leaving the additional step 10 is directed, via a pipe 11, to a step 12 of removal, via a biological treatment, in a biological filter 12A, of the soluble organic compounds remaining in the water.

The biological treatment of step 12 may consist of:
  a fixed culture process: typically a biological filter 12A, in particular of the BIOFOR® type, namely a biological reactor with fixed cultures on a fixed and immersed monolayer material, based on expanded clay,
  or a mixed (free and fixed) culture process: typically at biological reactor with free cultures as a mixture with fixed cultures on floating plastic supports;
  or a free culture process: activated sludge or membrane biological reactor.

Advantageously, the sludge resulting from the biological treatment of step 12 is directed, via a pipe 13, to the entry of step 10 so as to be recycled.

The sludge resulting from step 10 can be directed, via a pipe 14, to a centrifuge 15A where it undergoes a centrifugation treatment 15 which gives a liquid centrate which is recycled, via a pipe 16, to the entry of step 10. The sediment or pellet resulting from the centrifugation is evacuated to the discharge via a pipe 17.

The recyclings provided by the pipes 13 and 16, in combination with the centrifuge 15A, make it possible to have just one discharge output at the level of the pipe 17, which substantially simplifies the facility.

The treated water leaves the biological treatment step 12 via a pipe 18 and can be discharged into the natural environment.

The precise structure of the treatment line depends on the quality of the crude water to be treated that is introduced via the pipe 1 and on the standards which apply to the quality of water to be discharged.

The presence of a separator 2 of insoluble hydrocarbons is determined according to the amount of the oils and fats present in the water to be treated.

The presence of the separation step 10 for removing suspended matter depends on the type of biological treatment selected for step 12 and on the quality of the crude water. A biological treatment using free cultures, provided for in step 12, will be able to accept a greater load of suspended matter than treatments using fixed cultures.

The choice of the biological treatment, during step 12, is generally made according to the soluble pollution remaining in the water downstream of the stripper 4A. It will be noted that this soluble pollution is low in the case of the use of MSG (treatment with Mono Ethylene Glycol), or else is high in the case of the use of methanol, in the process for producing or conditioning natural gas.

The stripping of the BTEXs from the produced water by a stream of combustible gas, in particular of natural gas, is essential according to the invention, and is advantageously combined with the other treatment steps, in particular a biological treatment during step 12 for the water intended for discharge into the natural environment.

EXAMPLE

An example of a facility implementing the process of the invention is proposed for a natural gas production terminal. The water to foe treated originates from the production and conditioning of the gas. The quality of the water to foe treated is about:
  100 mg/l of suspended matter,
  900 mg/l of soluble BTEXs (in the produced water),
  600 mg/l of insoluble hydrocarbons (BTEXs included, originating from the produced water).

The objective is to obtain a treated water quality (for discharge into the sea) of:
  total BTEX<0.4 ppm (or 400 ppb—parts per billion),
  biological oxygen demand (BOD) <30 mg/l,
  chemical oxygen demand (COD) <160 mg/l,
  suspended matter <30 mg/l.

The treatment line proposed in this case is the following:
  removal of the insoluble hydrocarbons by means of a CPI (corrugated plate interceptor) separator 2;
  stripper 4A in the form of a column for stripping of BTEX by natural gas. In this case, a packed column is proposed because the water is not too loaded with suspended matter. The contaminated gas leaving the column is recycled, via the pipe 7, to the gas production facility. The stripping can reduce the total BTEX concentration to 20 ppm in this case;
  a flotation unit 10A for removing the residual insoluble hydrocarbons and the suspended matter present in the water. Upstream of the flotation unit 10A, coagulation and flocculation steps can be provided for in order to convert the hydrocarbons and the solids into a form compatible with separation by flotation. This flotation itself, during step 10, is carried out by injection of microbubbles of air into the flocculated water at the entry of the flotation unit;
  for the biological treatment 12, a biological filter 12A (BIOFOR® type) for removing the soluble organic pollution remaining in the water. The biological sludge generated by this filter is advantageously recycled, via the pipe 13, upstream of the flotation step 10 for treatment;
  discharge of the treated water leaving via the pipe 18, into the sea.

The invention is also applicable in the following cases:
  removal of the volatile hydrocarbons present in produced water originating from an oil production field,
  removal of BTEX or of the volatile hydrocarbons present in wastewater originating from an oil refinery, removal of BTEX or of the volatile organic compounds present in wastewater originating from a petrochemical factory.

In general, the invention relates to the case where the water to be treated is intended for discharge into the natural environment, but remains applicable to cases where reuse of the water treated by means of the process of the invention is envisioned.

The invention claimed is:

1. A process for treating wastewater containing hydrocarbons from the group of compounds referred to as BTEX, comprising benzene, toluene, ethylbenzene and xylene aromatic compounds, this wastewater originating from the production or conditioning of natural gas, the process comprising subjecting the wastewater to stripping by a combustible gas in a stripper such that the hydrocarbons are removed from the wastewater by transfer into the combustible gas and the combined combustible gas and hydrocarbons are combusted, wherein:
   the wastewater entering the stripper has a soluble BTEX content of less than or equal to 1200 ppm,
   the stripping combustible gas, prior to the stripping, comprises aromatic compounds and has a BTEX content of between 1,000 ppm and 15,000 ppm,
   and the weight ratio of the stripping combustible gas to the wastewater is less than 10%, and the water which leaves the stripper has a soluble BTEX content of less than or equal to 30 ppm.

2. The process as claimed in claim 1, wherein the weight ratio of the stripping combustible gas to the wastewater is less than 3%.

3. The process as claimed in claim 1, wherein the wastewater, after stripping, is subjected to a biological treatment.

4. The process as claimed in claim 3, wherein the biological treatment is carried out in fixed cultures, or in mixed cultures, or in free cultures.

5. The process as claimed in claim 3, further comprising a step for removing suspended matter and residual hydrocarbons is provided for between the stripping and the biological treatment.

6. The process as claimed in claim 5, wherein sludge from the biological treatment is recycled to the entry of the step for removing suspended matter which is provided for between the stripping and the biological treatment.

7. The process as claimed in claim 5, wherein sludge from the step for removing suspended matter is subjected to a dehydration, resulting in dehydrated sludge and a liquid, and the liquid produced is recycled to the entry of the step for removing suspended matter, while the dehydrated sludge is evacuated to a discharge.

8. The process as claimed in claim 1, further comprising recompressing the combustible gas having been used for the stripping of the water and sending the recompressed combustible gas to a distribution circuit for exploiting the calorific value of the BTEXs extracted from the water.

9. The process as claimed in claim 1, wherein the wastewater entering the stripper has a soluble BTEX content of less than or equal to 900 ppm.

10. The process as claimed in claim 2, wherein the weight ratio of the stripping gas to the wastewater is less than 2%.

11. The process as claimed in claim 1, wherein the combustible gas comprises a natural gas.

12. The process as claimed in claim 11, wherein the stripping natural gas, prior to the stripping, is obtained from the production or conditioning of natural gas from which the wastewater to be treated originates.

13. A facility for treating wastewater containing hydrocarbons from the group of compounds referred to as BTEX, the wastewater originating from the production or conditioning of natural gas, the facility comprising a combustible gas source directing combustible gas into a stripper, in which the wastewater is subjected to stripping, such that the hydrocarbons are removed from the wastewater by transfer into the combustible gas and the combined combustible gas and hydrocarbons are combusted,
   and further comprising a biological filter downstream of the stripper for a biological treatment of the water leaving the stripper,
   wherein the combustible gas provided by the combustible gas source to the stripper comprises aromatic compounds and has a BTEX content of between 1,000 ppm and 15,000 ppm.

14. The facility of claim 13, wherein the combustible gas comprises a natural gas.

* * * * *